United States Patent [19]
Hugon

[11] 3,922,031
[45] Nov. 25, 1975

[54] MOTORCYCLE SCREEN AND METHOD OF MAKING SAME

[76] Inventor: Daniel Hugon, 38 rue Pasteur, Moirans, en Montagne, Jura, France

[22] Filed: Nov. 12, 1973

[21] Appl. No.: 415,133

[30] Foreign Application Priority Data
Feb. 12, 1973 France .............................. 73.06384

[52] U.S. Cl. ............. 296/78.1; 240/46.53; 240/61.8
[51] Int. Cl.² ............................................ B62J 17/02
[58] Field of Search ..... 296/78.1; 240/46.45, 46.49, 240/46.53, 46.55, 46.23, 61.8

[56] References Cited
UNITED STATES PATENTS

| | | | |
|---|---|---|---|
| 1,489,728 | 4/1924 | Amick | 240/46.53 |
| 1,606,411 | 11/1926 | Goble | 240/46.53 |
| 3,154,342 | 10/1964 | Mueller | 296/78.1 |
| 3,527,932 | 9/1970 | Thomas | 240/46.53 |

FOREIGN PATENTS OR APPLICATIONS

| | | | |
|---|---|---|---|
| 1,255,486 | 1/1961 | France | 296/78.1 |
| 1,561,201 | 3/1969 | France | 296/78.1 |
| 833,299 | 1/1952 | Germany | 296/78.1 |
| 339,820 | 9/1959 | Switzerland | 296/78.1 |

*Primary Examiner*—Robert J. Spar
*Assistant Examiner*—Gary Auton
*Attorney, Agent, or Firm*—Dowell & Dowell

[57] ABSTRACT

The screen comprises a sleeve 11 of opaque elastomeric material fixed to the front deflector 10 in front of the headlight 6 by interlock and/or by an adhesive, and extending rearward substantially along the axis of headlight 6 for connection as a passage channeling the light rays to avoid reflection on the said deflector. Sleeve 11 extends across the deflector 10 and a groove 13 thereof is used for detachable fastening of a transparent bubble 10a produced from the same plastic material with deflector 10.

7 Claims, 4 Drawing Figures

MOTORCYCLE SCREEN AND METHOD OF MAKING SAME

DESCRIPTION OF THE INVENTION

The invention relates to motorcycle screens and means for supporting same.

Motorcycle screens comprise generally a front deflector serving a double purpose: to facilitate air inflow to increase the maximum speed or reduce consumption, and to protect the driver.

For reasons of economy the screen is advantageously arranged so that it can be mounted without modification on all motorcycles of usual make without drilling or welding, or even without disassembly and reassembly of accessories.

The front deflector is mounted on the handlebars in the case of a light screen, or on the frame in the case of a heavier, "integral" screen and normally located in front of the headlight.

One of the principal disadvantages of this type of screen, made of transparent material or provided with an opening in front of the headlight for the passage of the light beam, is that a driver traveling at night is handicapped by the headlight reflections on the screen.

The object of the invention is to eliminate this disadvantage by providing between the headlight and the screen an opaque connection opposing transmission of stray light toward the driver.

For this purpose, according to the invention, the screen comprises a sleeve of opaque natural or synthetic material, particularly the rubber known as Hypalon, fixed positively along its entire periphery to the front deflector ahead of the headlight, extending backward substantially along the headlight axis, and connected to the periphery of the headlight as a passage for the light beam to prevent reflection toward the deflector.

Advantageously, the sleeve extends completely through the front deflector.

The sleeve and the front deflector are preferably secured together by an adhesive and/or by interlock.

In an advantageous embodiment the front edge of the sleeve is provided with an outwardly opening peripheral groove into which the entire thickness of the deflector is fitted along an opening thereof for the passage of the said sleeve.

In another feature of the invention, the interior front edge of the sleeve, preferably in the thickness containing the outward groove for the fastening of the front deflector, is provided with an internal groove opening toward the axis to receive and retain the edge of a transparent bubble completing the portion of the front deflector surface limited by the sleeve to form a selectively removable window in front of the headlight.

In addition at least one peripheral stiffening rib and/or at least one peripheral corrugation or fold is arranged between the two ends of the sleeve as an additional thickness to provide it with a degree of axial mobility.

In most cases, especially when the screen front deflector is fixed to the handlebars, the end of the sleeve opposite that to which the deflector is fixed is suitably provided, beyond an elastic ring, with an edge flared toward the periphery and used as a grip to slip the sleeve with the said ring onto the headlight.

In other cases, especially when the front deflector is fixed to the motorcycle frame, the sleeve is suitably extended backward by opaque, flexible flaps or tabs forming an opaque brushlike structure for connection to the headlight when the said headlight is in a position substantially coaxial with the sleeve and permitting when needed lateral escape of the headlight from the sleeve by a pivoting sweeping motion.

It will be understood that, particularly in the last case, and also generally, the headlight is preferably adjustable relative to the deflector to obtain very precise coaxial alignment relative to the sleeve, and also for distance adjustment adapted to the sleeve length.

For this purpose, in another feature of the invention, the headlight is separated from the brackets connecting it to the motorcycle fork by a spacer for the eccentric passage of the screws used for clamping to the headlight and to the bracket. The passage for at least one of the two screws is relatively long to permit longitudinal adjustment of the headlight position. The height is adjusted by pivoting the spacers on their screws before tightening thereof.

The invention relates also to a way of supporting a sleeve on a shield comprising a transparent plastic material front deflector, in which the front end of the opaque elastomeric material sleeve extends completely through the shield between the bubble constituting the central window and the edge of an opening provided in the front deflector around the said window, the edges of the said bubble and opening being fitted in the same thickness in the internal and external surfaces of the front edge of the sleeve. The method consists in cutting out the bubble in the preliminarily shaped front deflector with a rotating tool to remove deflector material between the bubble and the surrounding front deflector portion along a ring whose width is substantially equal to the thickness of the sleeve between the bottoms of the two retaining grooves thereof.

An example intended to clarify the invention, its features, and related advantages is illustrated in the attached drawing.

Figure 1:
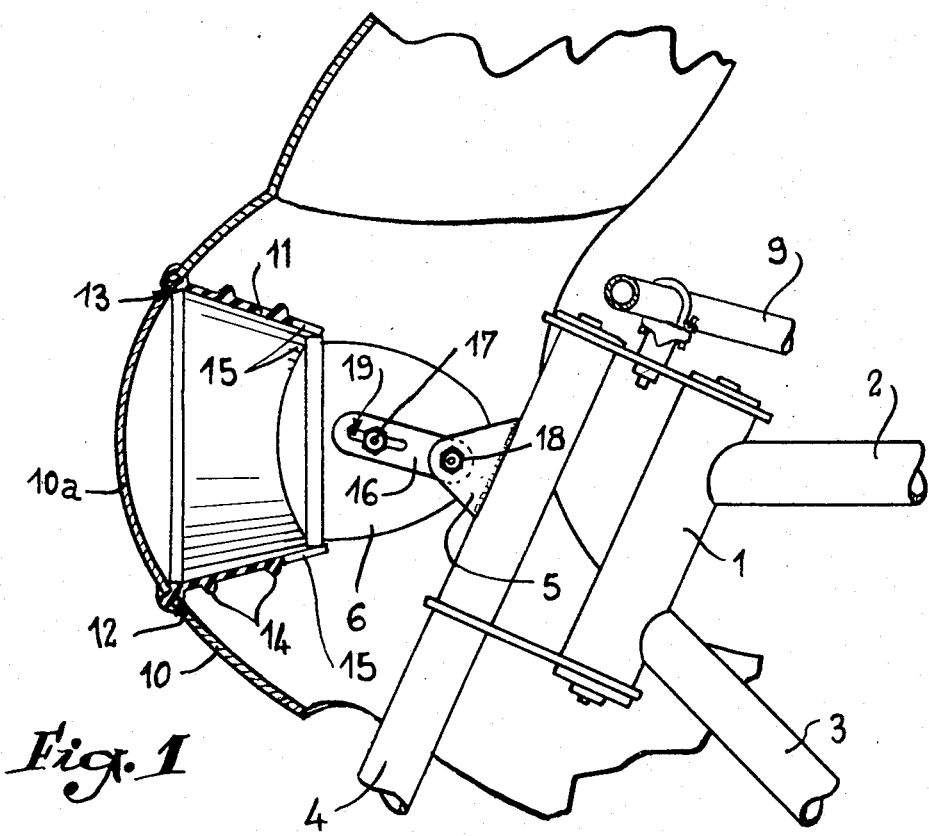
FIG. 1 is a partial elevation and partial section representing schematically parts of the front of a motorcycle provided with a screen according to the invention.

In the drawings, a tube 1 constitutes a part of the frame 2,3 of a standard motorcycle and extends in the vertical plane of symmetry thereof to constitute a pivot bearing for the forks whose branches 4 and 4a carry brackets 5 and 5a.

A headlight 6 conventionally fixed between brackets 5 and 5a is adjustable in inclination about a horizontal axis and blocked by clamping screws 7 (FIGS. 3 and 4) threaded through brackets 5 into lateral lugs 8 and 8a of the headlight.

Figure 2:
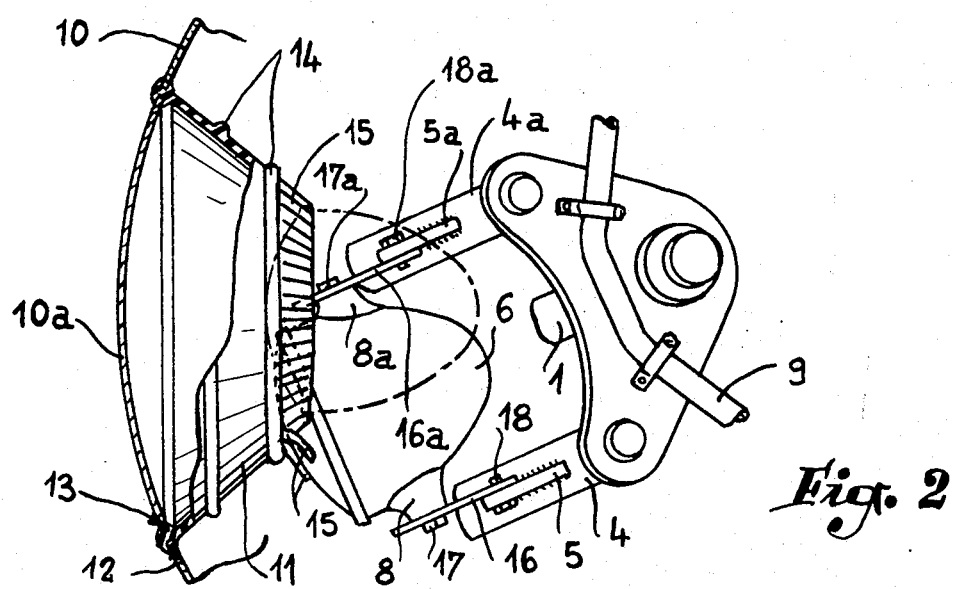
FIG. 2 is a partial plan view and partial section of a diagram of the same parts of a motorcycle provided with a screen in a different position of the fork and headlight relative to the front deflector of the screen.

In the case of the embodiment illustrated in FIGS. 1 and 2 the motorcycle is equipped with a wide, highly covering screen of the "integral" type, i.e., fixed to frame 1,2,3 by fastening means (not represented). It is understood that in these conditions when the handlebars 9 are moved headlight 6 is pivoted relative to the front deflector 10 of the screen (FIG. 2) by an angle remaining small at high speed but increasing to a relatively great size when the motorcycle is operated at low speed, for example to park.

Naturally, it would be possible to dismount headlight 6 and remount it forward on deflector 10 if brackets similar to brackets 5 and 5a are provided on the said deflector.

But such an arrangement is not satisfactory because it increases the weight of the deflector, and complicates the mounting operation of the screen on the motorcycle, and also because it would impair the streamlining and the appearance of the vehicle.

Therefore, normally front deflector 10 is preferably mounted ahead of headlight 6.

Two structures are then possible: an opening for the passage of the light beam, coaxial with the said beam, is provided in the deflector, or the said deflector is made entirely of a transparent plastic material.

In both cases it will be difficult to avoid in all conditions — i.e., even when vibrations occur in high speed night driving — effective screening by the connection between headlight 6 and front deflector 10, which is an absolute condition for the prevention of light reflections capable of propagating to deflector 10 and reflecting toward the driver.

To avoid these light reflections in all conditions a sleeve 11 of opaque natural or synthetic elastomeric material, particularly Hypalon-base rubber is mounted between headlight 6 and front deflector 10 and, according to the invention, fixed positively and continuously along its entire front periphery to deflector 10 from which it extends rearward to join the periphery of the headlight 6. As shown in the drawing sleeve 11 extends all the way through deflector 10.

In an advantageous embodiment the front edge of sleeve 11 is provided with a peripheral groove 12 opening outward and engaged by deflector 10 along an opening provided therein for the passage of sleeve 11.

Sleeve 11 is fixed to deflector 10 by an adhesive or by the combination of interlock and adhesive.

It is understood that light rays can propagate between sleeve 11 and deflector 10 or through the said deflector even if it is made of transparent material through no point of the joint between the said elements, and cannot be reflected toward and blind the driver. Such light transmission could occur, for example particularly as a result of driving vibrations or through a locally more or less curved line of contact with deflector 10 if sleeve 11 is applied elastically by simple axial thrust against an internal surface of deflector 10 instead of being fixed thereto positively and without discontinuity.

Aside from this it may be advantageous to provide the internal front edge of sleeve 11 and, in the illustrated embodiment, in the thickness containing groove 12, with an internal groove 13 opening toward the axis, and to retain the edge of a bubble 10a completing the shape of front deflector 10 in its portion limited by the line of the joint with sleeve 11 to constitute a possibly removable window in front of the headlight.

Figure 4:
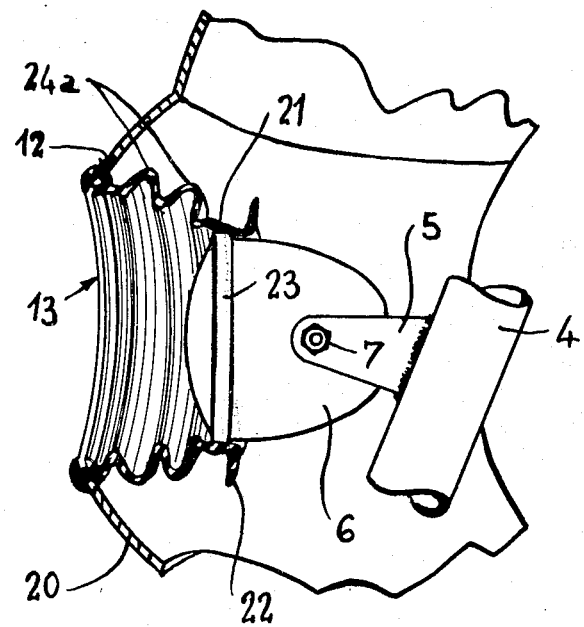

As shown in FIG. 4, removal of window or bubble 10a restores the total illumination power of headlight 6, obviates violations of local regulations, and permits mounting the screen on a used motorcycle.

To improve its strength a plurality of peripheral stiffening ribs 14 are suitably provided between the front and back ends of sleeve 11.

The above described screen elements are applicable to all screens constructed according to the invention regardless of the fastening of front deflector 10 to the motorcycle.

In the case of an integral screen as more specifically illustrated in FIGS. 1 and 2 headlight 6 is suitably connected to sleeve 11 so that it can escape from the said sleeve 11 as fork 4, 4a pivots laterally in frame tube 1 (FIG. 2), at least in some cases (low speed parking operation).

For this purpose, in another feature of the invention, sleeve 11 is extended rearward by opaque, flexible flaps or tabs forming an opaque brushlike element simply resting on the front periphery of headlight 6.

In a particularly simple embodiment illustrated in the drawing the said flaps 15 are produced by cutting a number of slits along generatrices without removal of material in the rear edge of sleeve 11.

In any case, if the connection between the rear edge of sleeve 11 and the front of headlight 6 is adjusted and centered with precision headlight 6 can escape laterally, as shown particularly in FIG. 2, by a sweeping motion on the rear flap edge of sleeve 11.

In another feature of the invention, for precise centering and longitudinal adjustment of headlight 6 relative to sleeve 11 two spacers 16 and 16a are suitably inserted between the lugs 8 and 8a of the headlight and the brackets 5 and 5a of the fork, and act as extendable rods capable of being locked in an adjustable direction by clamping screws 17 and 17a on headlight 6, and by clamping screws 18 and 18a on brackets 5 and 5a.

The slots 19 through which screws 17 and 17a pass through spacers 16 and 16a extend toward the holes into which screws 18 and 18a are screwed into the same spacers to permit adjustment of the distance between the axes of screws 17, 18 and 17a, 18a, respectively.

It is clear that with two spacers 16 and 16a arranged in this manner the longitudinal position of headlight 6 can be adjusted by sliding of slots 19 on screws 17 and 17a before tightening of the said screws. The height of the headlight can be adjusted by pivoting the spacers about the said screws before they are tightened in lugs 8 and 8a and brackets 5 and 5a, respectively.

Figure 3:
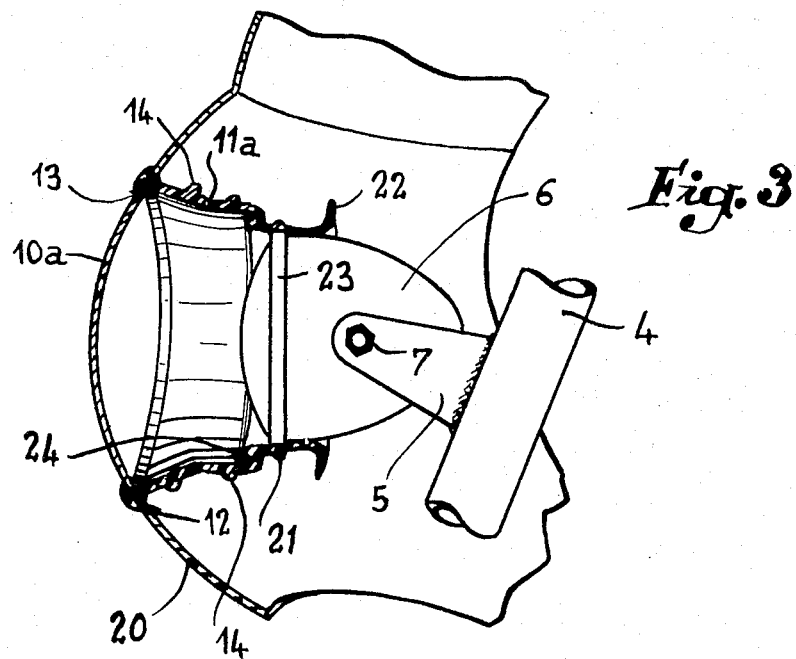
FIGS. 3 and 4 represent as in FIG. 1 parts of the front of a motorcycle provided with a screen, according to two other features of the invention.

In the case of a light screen fixed directly on the motorcycle fork, which is supposed to be the case of the embodiments illustrated in FIGS. 3 and 4, the front deflector 20 moves rigidly with headlight 6 in all conditions, which permits the use of a simplified connection between the rear end of sleeve 11a and headlight 6. The front end of sleeve 11a is fixed to deflector 20 in the manner described for sleeve 11 and deflector 10 in reference to FIGS. 1 and 2.

The rear end of the sleeve is then suitably provided with an elastic ring 21 carrying a very thin and flexible cover acting as a sealing lip and extending radially inward. In addition, the sleeve is extended rearwardly, beyond ring 21 and the said cover, by a flaring edge 22 extending toward the periphery to constitute a grip for use by the person fitting the screen and permitting uniform slipping of the sleeve, using the said ring 21 and cover, on the peripheral ring 23 of the headlight.

Aside from this, sleeve 11a is suitably mounted for a degree of axial mobility, i.e., a kind of telescopic mobility, as illustrated in FIG. 3 by means of a single, S-shaped peripheral fold 24, and in the case of FIG. 4 by means of a plurality of accordionlike corrugations 24a.

If front deflector 10 and bubble 10a can be made of the same transparent plastic material the invention provides a simplified production method consisting in fabricating first a complete front deflector of final convex shape, cutting out the bubble 10a with a rotating tool removing material between the edge of bubble 10a and portion 10 from the surrounding front deflector along a ring whose width is substantially equal to the thickness of sleeve 11 remaining between the bottoms of retaining grooves 12 and 13.

The rotating tool used for this purpose is of the trepan type in the form of a shell of revolution whose circular edge constitutes a sawtooth blade and which is rotated about its axis.

I claim:

1. A motorcycle screen for channeling a light beam from a headlight mounted on the motorcycle through a window opening in a wind deflector fixed on the motorcycle in front of the headlight, the light channeling screen comprising an opaque sleeve extending from the headlight all the way through the window opening in front of said deflector and confining the light beam emitted by the headlight to shine in front of the deflector, said sleeve being made of an elastomeric material and having a forward periphery shaped to be clamped all the way around said periphery to the deflector at said window opening so that the light channeling screen is supported by and positively fixed to the said deflector to prevent lateral escape of light rays between the front edge of the sleeve and the deflector on which it is mounted thereby preventing glare of light on the deflector, the forward periphery of the sleeve including an annular groove opening outward and engaging and gripping the edge of said window opening provided in the deflector for the passage of the said sleeve therethrough.

2. The screen as in claim 1, wherein the forward periphery of the sleeve includes an annular portion of increased thickness having an internal groove opening toward the inside of said sleeve, and a transparent window member supported in said internal groove and completing the shape of the front deflector in the area thereof bounded by the sleeve to constitute a removable window in front of the headlight.

3. The screen as in claim 3, wherein the sleeve includes at least one peripheral stiffening rib between the two ends thereof.

4. The screen as in claim 1, wherein the sleeve comprises between the two ends thereof, at least one peripheral telescoping corrugation providing therefor a degree of mobility in the axial direction.

5. The screen as in claim 1, wherein the end of the sleeve opposite that fixed to the front deflector terminates in an elastic ring provided with a peripherally flared edge extending rearwardly and slipping over the headlight with the said ring abutting the headlight.

6. The screen as in claim 1, wherein the sleeve carries rearward extending opaque flexible tabs forming an opaque brushlike member extending to the headlight when the said sleeve is coaxial with the headlight and permitting the escape of the headlight from the screen when it is pivoted out of coaxial alignment.

7. The screen as in claim 1, wherein the motorcycle has a fork, brackets fastening the headlight to the motorcycle fork, a spacer and screw means connecting the headlight to the said brackets, the latter having at least one hole in the form of a slot receiving said screw means for longitudinal adjustment of the headlight relative to the fork, the height thereof being adjusted to the level of the sleeve by pivoting said screw means prior to the tightening thereof.

* * * * *